United States Patent
Yue et al.

(10) Patent No.: US 12,554,476 B2
(45) Date of Patent: Feb. 17, 2026

(54) COMPUTER MULTI-APPLICATION DEPLOYMENT

(71) Applicant: INTERNATIONAL BUSINESS MACHINES CORPORATION, Armonk, NY (US)

(72) Inventors: Le Yue, Beijing (CN); Xiao Ling Chen, Beijing (CN); Si Yu Chen, Beijing (CN); Han Wen Zhu, Beijing (CN); Qing Yu Pei, Beijing (CN); Ming Lei Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 313 days.

(21) Appl. No.: 18/332,219

(22) Filed: Jun. 9, 2023

(65) Prior Publication Data
US 2024/0411536 A1 Dec. 12, 2024

(51) Int. Cl.
*G06F 8/61* (2018.01)
*G06F 8/71* (2018.01)

(52) U.S. Cl.
CPC . *G06F 8/63* (2013.01); *G06F 8/71* (2013.01)

(58) Field of Classification Search
CPC .................................. G06F 8/63; G06F 8/71
See application file for complete search history.

(56) References Cited

U.S. PATENT DOCUMENTS

| | | | |
|---|---|---|---|
| 10,002,247 B2 | 6/2018 | Suarez et al. | |
| 10,635,694 B2 | 4/2020 | Petri et al. | |
| 10,897,497 B2 | 1/2021 | Sabath et al. | |
| 11,489,943 B2 | 11/2022 | Bonas | |
| 11,656,864 B2 * | 5/2023 | Chen | G06F 8/63 717/168 |
| 12,282,460 B2 * | 4/2025 | McNamee | G06F 9/45558 |
| 12,287,825 B1 * | 4/2025 | Wu | G06F 16/535 |
| 2018/0088926 A1 * | 3/2018 | Abrams | H04L 67/568 |
| 2019/0146772 A1 * | 5/2019 | Griffin | G06F 11/3698 717/121 |
| 2020/0004528 A1 * | 1/2020 | Pape | G06F 8/65 |
| 2022/0156053 A1 | 5/2022 | Shaastry et al. | |
| 2023/0325169 A1 * | 10/2023 | Chibon | G06F 9/45533 717/168 |
| 2024/0419423 A1 | 12/2024 | Chen et al. | |
| 2025/0238250 A1 * | 7/2025 | Duarte | G06F 9/45558 |

FOREIGN PATENT DOCUMENTS

| CN | 106603592 B | 10/2019 |
|---|---|---|
| CN | 111427609 A | 7/2020 |

OTHER PUBLICATIONS

Chen et al., U.S. Appl. No. 18/062,266, filed Dec. 6, 2022, entitled: "Deployment of Updated Services or Layers on Demand Through Containers", 39 pages.

* cited by examiner

Primary Examiner — Marina Lee
(74) Attorney, Agent, or Firm — Michael A. Petrocelli

(57) ABSTRACT

Techniques according to the present disclosure may include receiving, at a computer, a command for performing an action on a first image layer of a first container repository. A second container repository is determined which has a dependency on the first container repository, based on a dependency graph storing dependencies of a plurality of container repositories. The action is performed on the first image layer of the first container repository and a corresponding action on a second image layer of the second container repository based on the command.

20 Claims, 5 Drawing Sheets

COMPUTER MULTI-APPLICATION DEPLOYMENT

BACKGROUND

The present invention relates to the field of computer technology related to multi-software application deployment on a computer.

Multiple software applications may be deployed on multiple nodes, such as computer, with repositories to provide multiple services, by using container technologies. Containers allow developers to isolate and run multiple applications on a single operating system instead of dedicating a virtual machine to each application on a server. During the multi-application deployment, when one application is updated, other interdependent applications may also need to be updated, so as to keep compatibilities of these interdependent applications.

SUMMARY

According to one embodiment of the present invention, a computer-implemented method for multiapplication deployment. The method may comprise receiving, by one or more processors, a command for performing an action on a first image layer of a first container repository. The method may further comprise determining, by the one or more processors, a second container repository which has a dependency on the first container repository, based on a dependency graph storing dependencies of a plurality of container repositories. The method may further comprise performing, by the one or more processors, the action on the first image layer of the first container repository and a corresponding action on a second image layer of the second container repository based on the command.

According to another embodiment of the present invention, a system for multiapplication deployment. The system may comprise one or more processors and a memory coupled to at least one of the one or more processors. The system may comprise a set of computer program instructions stored in the memory and executed by at least one of the one or more processors in order to perform an action of receiving a command for performing an action on a first image layer of a first container repository. The system may comprise a set of computer program instructions stored in the memory and executed by at least one of the one or more processors in order to perform an action of determining a second container repository which has a dependency on the first container repository, based on a dependency graph storing dependencies of a plurality of container repositories. The system may comprise a set of computer program instructions stored in the memory and executed by at least one of the one or more processors in order to perform an action of performing the action on the first image layer of the first container repository and a corresponding action on a second image layer of the second container repository based on the command.

According to a further embodiment of the present disclosure, a computer program product for multiapplication deployment. The computer program product may comprise a computer readable storage medium having program instructions embodied therewith. The program instructions may be executable by a device to cause the device to perform a method. The method may comprise receiving a command for performing an action on a first image layer of a first container repository. The method may further comprise determining a second container repository which has a dependency on the first container repository, based on a dependency graph storing dependencies of a plurality of container repositories. The method may further comprise performing the action on the first image layer of the first container repository and a corresponding action on a second image layer of the second container repository based on the command.

According to the present application, interdependent applications may be deployed and updated automatically and efficiently.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
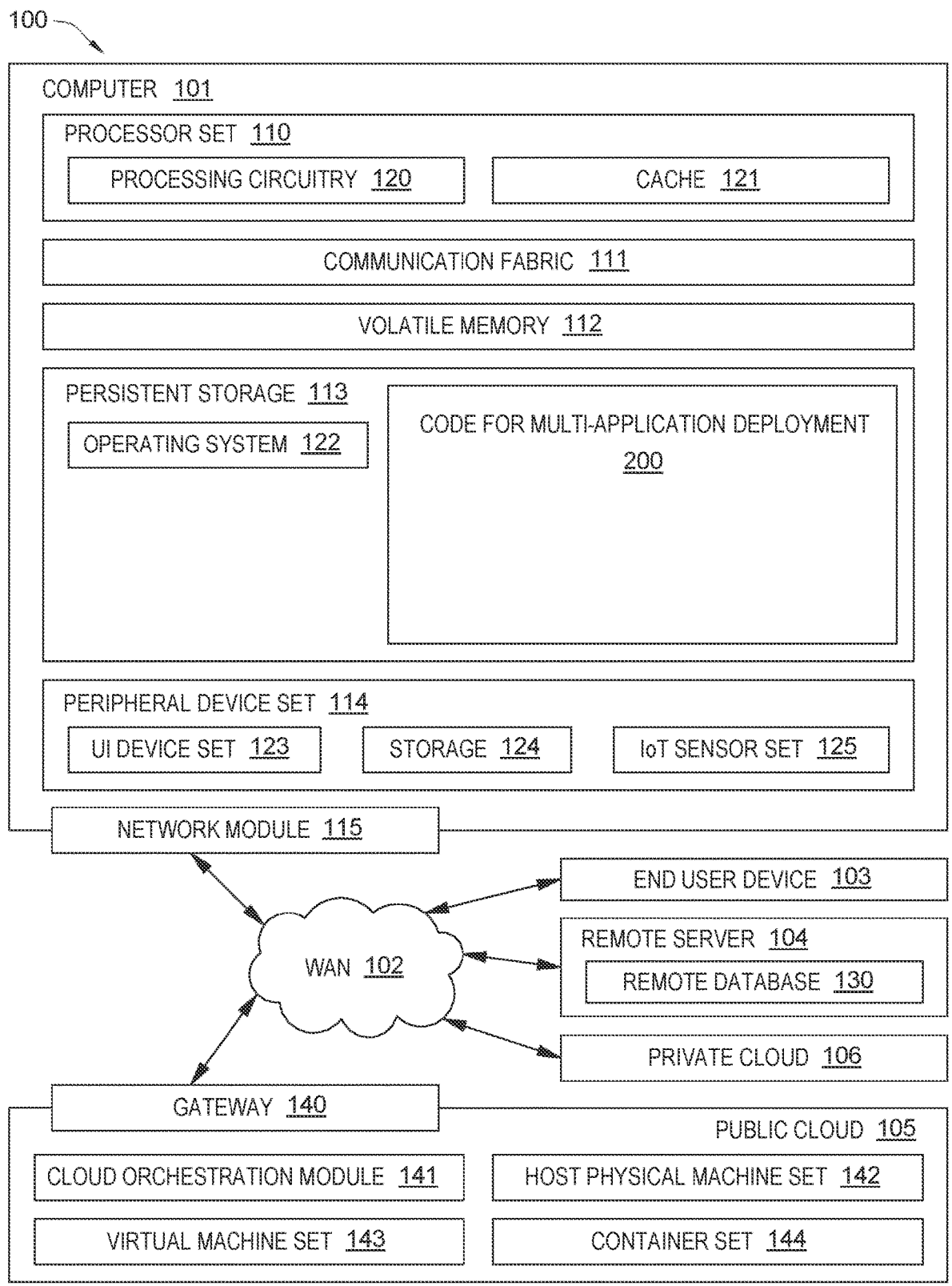
FIG. 1 shows an exemplary computing environment which is applicable to implement the embodiments of the present invention.

Applications are upgraded frequently in a development and test environment or in production environment of an end user. Errors may be frequently caused by an incompatibility between the version of the upgraded application and the versions of other interdependent applications in the environment.

Therefore, when an application is upgraded, it is necessary to upgrade other interdependent applications into compatible versions with the upgraded application. However, it may be difficult for a developer or the end user to complete all the upgrades because the developer or the end user cannot easily figure out the interdependencies of multiple applications. On the other hand, if all applications are upgraded in response to the upgrade of one application, without considering the dependencies among applications, there would be a huge impact on the development or production environment, leading to inefficiency and may raise the error rate of deployment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as code for multi-application deployment 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future.

In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

It is understood that the computing environment 100 in FIG. 1 is only provided for illustration purpose without suggesting any limitation to any embodiment of this invention, for example, at least part of the program code involved in performing the inventive methods could be loaded in cache 121, volatile memory 112 or stored in other storage (e.g., storage 124) of the computer 101, or at least part of the program code involved in performing the inventive methods could be stored in other local or/and remote computing environment and be loaded when need. For another example, the peripheral device 114 could also be implemented by an independent peripheral device connected to the computer 101 through interface. For a further example, the WAN may be replaced and/or supplemented by any other connection made to an external computer (for example, through the Internet using an Internet Service Provider).

With reference now to FIGS. 2~7, some embodiments of the present disclosure will be described below.

Figure 2:
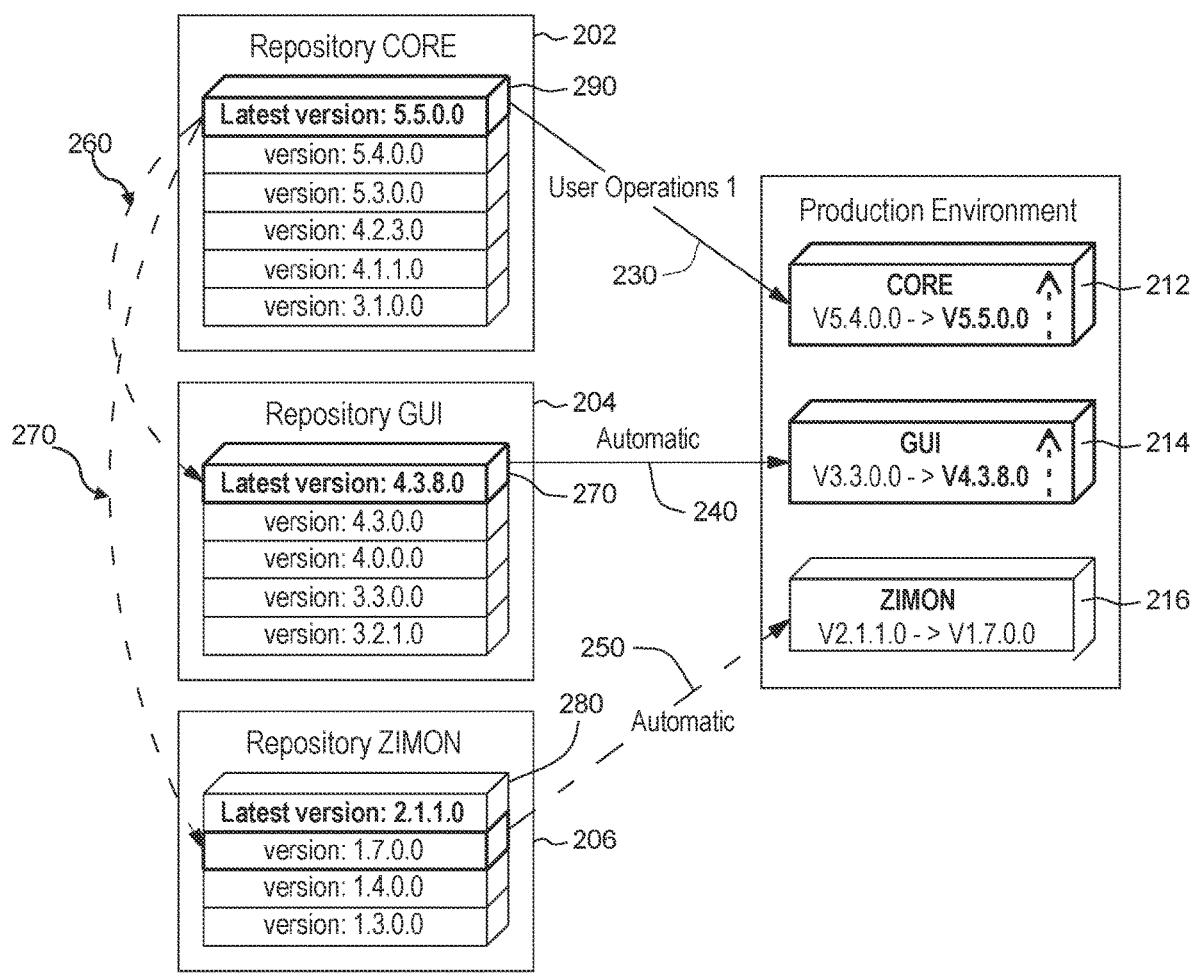
FIG. 2 shows an exemplary upgrading process of multiple interdependent applications according to some embodiments of the present invention.

FIG. 2 shows an exemplary upgrading process of multiple interdependent applications according to some embodiments of the present invention.

In the scenario shown in FIG. 2, "CORE" 212, "GUI" 214 and "ZIMON" 216 are three applications running on the user's host device, wherein "CORE" 212 performs core operations such as reading, writing, etc., "GUI" 214 performs visualized operations such as displaying graphical interfaces, and "ZIMON" 216 is a monitoring tool for monitoring operation performances.

Further, the applications in FIG. 2 are deployed based on container technologies. Specifically, there are three container repositories "CORE" 202, "GUI" 204 and "ZIMON" 206, for storing multiple image layers used to provide different versions of respective applications. Further, each image layer of a container repository consists of a container image, which is a file that includes code, resources and tools that this version of application may need to run.

Assuming that in the production environment, the end user requires to upgrade "CORE" 212 from a current version of 5.4.0.0 to the latest version 5.5.0.0. In response to a command from the user instructing the upgrade (corresponding to "user operation 1" 230 shown in FIG. 2), the latest version 5.5.0.0, as depicted as 290, is downloaded from the corresponding container repository "CORE" 202, so that in the production environment of the end user, the application "CORE" 212 is upgraded from version 5.4.0.0 to the latest version 5.5.0.0.

However, as can be seen from FIG. 2, the other two applications "GUI" 214 and "ZIMON" 216 have dependencies on "CORE" 212, and may also need to be upgraded in response to the upgrade of "CORE" 212. For example, it was determined based on the architecture of these applications that if "CORE" 212 is upgraded to version 5.5.0.0, "GUI" 214 should be upgraded into the latest version and "ZIMON" 216 should be ensured to be version 1.7.0.0 or above. These dependencies are shown by the dotted arrows 260 and 270 in FIG. 2.

However, as for the end user, it is difficult for himself to figure out the dependencies and making corresponding commands to upgrade "GUI" 214 and "ZIMON" 216 properly. Even for the developers, it may take a lot of time to inspect the dependencies of these applications. Further, errors may be occurred due to an incompatibility of the upgraded "CORE" 212 and non-upgraded "GUI" 214 and "ZIMON" 216.

In FIG. 2, an action of upgrading an application is taken as an example of updating action on the application. However, it should be noted that other updating actions may also be performed on the application, such as modification, addition, deletion of the application. As long as a certain action is performed on one application, it is preferred that a corresponding action is performed to other interdependent applications, so as to keep compatibility between these applications.

In view of one or more of the above problems, in the present application, there is provided a way to automatically deploy and update the interdependent applications. For example, in response to the upgrade of "CORE" 212, it is desired that the "GUI" 214 may be automatically upgraded from version 3.3.0.0 to the required latest version 4.3.8.0 (shown in FIG. 2 as a solid arrow 240). Further, it may also be desired to automatically notice that since the version 2.1.1.0 of "ZIMON" 216 running on the production environment of the end user is above the required minimum version of 1.7.0.0, the upgrade for "ZIMON" 216 is not to be performed (shown in FIG. 2 as a dotted arrow 250).

Figure 3:
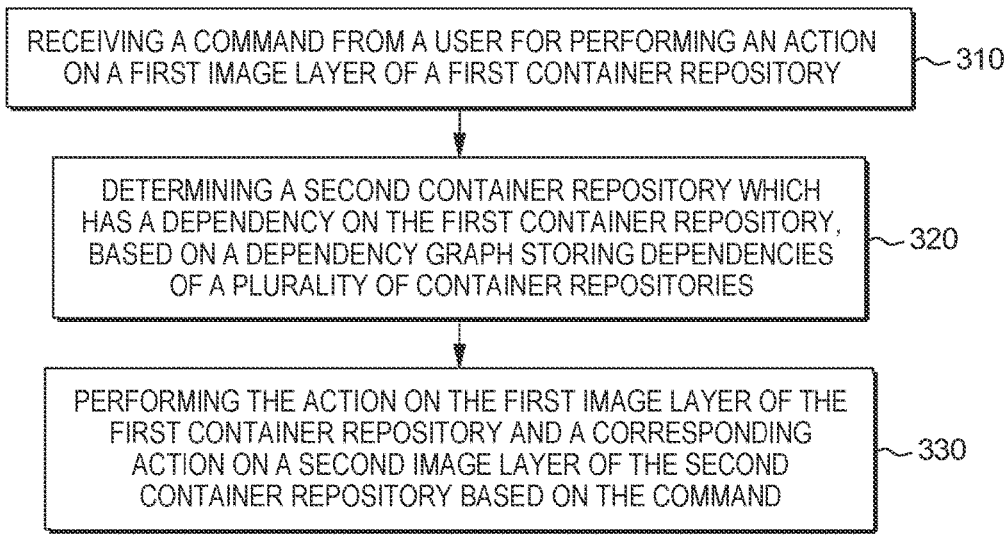
FIG. 3 shows a flow chart of an exemplary method for multi-application deployment according to some embodiments of the present invention.

Now refer to FIG. 3, which shows a flow chart of an exemplary method 300 for multi-application deployment according to some embodiments of the present invention. The desired automatic deployment and update of interdependent applications described above may be achieved by using the method 300.

In some embodiments, in block 310, one or more processors may receive a command from a user for performing an action on a first image layer of a first container repository. The user may be a developer in the development and test environment or an end user in the production environment, or any other user who triggers the command. The command may be any update command for the application related to the first container repository, including but not limited to upgrade, modification, addition, deletion of the application. Further, the action based on the command may include but not limited to downloading, modifying, or any other actions on the first image layer.

Taking the above FIG. 2 as an example, the container repository "CORE" 202 shown in FIG. 2 may be an example of the first container repository, and the latest version image layer (e.g., the upmost image layer) shown in FIG. 2 with a latest version 5.5.0.0 may be an example of the first image layer. Further, the command from the user may be a command to upgrade "CORE" 202 from version 5.4.0.0 to the latest version 5.5.0.0. Accordingly, the action to be performed on the first image layer is downloading the first image layer.

In some embodiments, in block 320, the one or more processors may determine a second container repository which has a dependency on the first container repository, based on a dependency graph storing dependencies of a plurality of container repositories.

For example, the following Table 1, on the following page, shows the dependencies of the three container repositories "CORE" 202, "GUI" 204, and "ZIMON" 206 of FIG. 2, which means that in response to the update of CORE 212, the update of GUI 214 and ZIMON 216 should also be ensured. These dependencies may be represented by the nodes and edges of the dependency graph. In some embodiments, a node in the dependency graph may represent a container repository, and an edge between two nodes may represent a dependency between the two nodes. Accordingly, the dependency graph may represent dependencies of multiple container repositories. In some embodiments, the dependency graph may be further specified as a directed graph in which an edge from node A to node B represents that node A depends on node B.

TABLE 1

| Container Repository | Dependent Container Repository |
|---|---|
| CORE | GUI |
| CORE | ZIMON |

Again, taking the above FIG. 2 as an example, the container repository "GUI" 204 and the container repository "ZIMON" 206 (which are examples of the second container repository) may be determined based on the dependency graph as having dependencies on the container repository "CORE" 202 (example of the first container repository).

In some embodiments, the dependency graph may be determined based on the architecture of multiple applications during the development process. Since the developer knows exactly the interdependencies of multiple applications under development, the developer may record the dependencies for each application, for example, as in Table 1. By reading the pre-recorded dependencies for multiple applications, the dependency graph may be automatically generated.

In some embodiments, in block 330, the one or more processors may perform the action on the first image layer of the first container repository and a corresponding action on a second image layer of the second container repository based on the command.

For example, for the action of downloading the latest version 5.5.0.0 of "CORE", since it is determined in S320 that "GUI" 214 has a dependency on "CORE" 212, an image layer of "GUI" may be downloaded accordingly. Further, it may be determined in S320 that "ZIMON" 216 also has a dependency on "CORE" 212, and an image layer of "ZIMON" 216 may also be downloaded accordingly. Therefore, the version of "GUI" 214 and the version of "ZIMON" 216 are upgraded together with the upgrade of the version of "CORE" 212, and a compatibility of the three interdependent applications may be ensured.

Based on the method 300 according to some embodiments of the present disclosure, interdependent applications may be deployed and updated automatically and efficiently. As a result, both developers and end users can easily maintain and upgrade the whole environment without the need for extra work to consider version compatibility between applications.

The second container repository is determined as having a direct dependency on the first container repository, as shown in block 320. Further, in some embodiments, a third container repository may be further determined which has a dependency on the second container repository, and may have an indirect dependency on the first container repository. Further, a corresponding action on a third image layer of the third container repository (e.g., downloading the third image layer) may be performed based on the command from the user. The method 300 may be performed recursively to determine all direct/indirect dependencies on the first container repository, and perform corresponding actions on image layers of the determined directly/indirectly dependent container repositories.

In some embodiments, the one or more processors may determine the latest version image layer of the second container repository, as the second image layer, as shown in block 330.

For example, the latest version image layer 270 (i.e., the upmost image layer) with version 4.3.8.0 of the container repository "GUI" 214 may be determined as the second image layer on which a corresponding action is to be performed. Further, the latest version image layer 280 (i.e., the upmost image layer) with version 2.1.1.1 of the container repository "ZIMON" 216 may be determined as the second layer. By determining the second image layer as the latest version image layer, the compatibility may be ensured more easily and directly, because the latest version of the image layer would always be compatible with image layers of other interdependent container repositories. It is noted that the second image layer may also be determined as other default image layer instead of the latest version image layer according to actual needs.

The above-described dependency graph records the dependencies of different container repositories, which may roughly represent the dependencies of multiple applications. This kind of dependency graph may also be referred to as a "rough dependence graph" in this disclosure. Further, in some embodiments, a "refined dependency graph" may be designed to further store dependencies of a plurality of image layers of different container repositories. The refined dependency graph may not only represent the dependencies of different container repositories, but also dependencies of one image layer in one container repository and another image layer in another container repository, which may provide more specific representations of dependencies.

By using the refined dependency graph, the one or more processors may determine an image layer of the second container repository which has a dependency on the first image layer of the first container repository, based on the dependency graph, as the second image layer, as shown in block 320.

Figure 4:
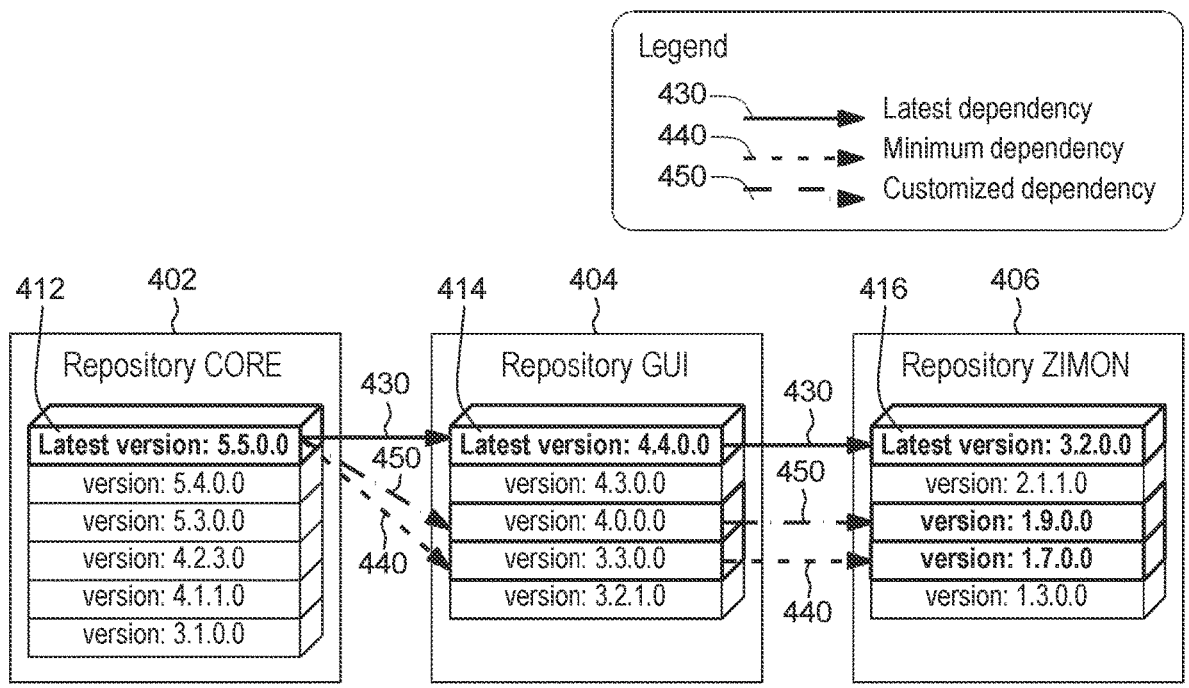
FIG. 4 shows three dependency modes including 1) a latest dependency mode; 2) a minimum dependency mode; and 3) a customized dependency mode according to some embodiments of the present invention.

FIG. 4 shows three exemplary dependency modes according to some embodiments of the present disclosure, including 1) a "latest dependency" mode 430; 2) a "minimum dependency" mode 440; and 3) a "customized dependency" mode 450. These dependencies modes may be represented by the refined dependency graph.

In some embodiments, for the latest dependency mode, as shown in FIG. 4, the latest version image layer of the second container repository is determined as the second image layer having a dependency on the first image layer.

For example, for the container repository "CORE" 402, the target image layer (which means the image layer for which one or more dependent image layers are to be determined) is the latest version 412 5.5.0.0, and the latest version 4.4.0.0 of "GUI" 404 is determined as having a dependency on the target image layer of "CORE" 402. Further, for the container repository "GUI", the target image layer is the latest version 414 4.4.0.0, and the latest version 3.2.0.0 of "ZIMON" 406 is determined as having a dependency on the target image layer of "GUI" 404. In other words, in the latest dependency mode, in order to run "CORE" 402 with version 5.5.0.0, the latest version 4.4.0.0 of "GUI" 404 and the latest version 3.2.0.0 of "ZIMON" 416 must be ensured in the production environment.

This latest dependency mode is similar as the rough dependency graph described above which only stores dependencies of different container repositories, and a latest version image layer of a respective container repository is determined as the second image layer having a dependency on the first image layer by default.

In some embodiments, for the minimum dependency mode, an available oldest version image layer of the second container repository is determined as having the dependency on the first image layer.

The available oldest version image layer may be determined by the developer during the development process of the application, which may be the image layer being compatible with the target image layer but having an oldest version in its container repository. For example, as shown in FIG. 4, GUI 404 version 3.3.0.0 is determined as the available oldest version image layer having a dependency on CORE 402 version 5.5.0.0, and ZIMON 406 version 1.7.0.0 is determined as the available oldest version image layer having a dependency on GUI 404 version 3.3.0.0. In other words, in the minimum dependency mode, in order to run "CORE" 402 with version 5.5.0.0, "GUI" 404 in the production environment must be ensured as version 3.3.0.0 or above and "ZIMON" 406 in the production environment must be ensured as version 1.7.0.0 or above. Further, if the current version of "GUI" 494 or "ZIMON" 406 running on the production environment is above the available oldest version, no corresponding action (e.g., downloading) for the image layer of the container repository is necessary.

In some embodiments, for the customized dependency mode, an image layer of the second container repository specified by the user may be determined as having the dependency on the first image layer.

In this mode, a customized dependency may be specified by the user (e.g. the end user of the production environment) according to actual need. For example, as shown in FIG. 4, the customized dependency may be determined as GUI version 4.4.0.0 414 having a dependency on CORE version 5.5.0.0 412, and ZIMON version 1.9.0.0 418 having a dependency on GUI version 4.4.0.0. 414 In other words, in the customized dependency mode, in order to run "CORE" with version 5.5.0.0 412, "GUI" in the production environment must be ensured as version 4.4.0.0 414 and "ZIMON" in the production environment must be ensured as version 1.9.0.0 418.

Further, in some embodiments, in the customized dependency mode, the user may specify multiple customized dependent image layers according to actual needs. For example, it may be customized by the user that in order to run "CORE" with version 5.5.0.0, "GUI" with version 4.4.0.0 and 3.3.0.0 may be ensured in the production environment.

In some embodiments, a dependency parameter may be set to indicate different dependency modes. For example, for the three modes, a field with at least two bits may be set to differentiate the three modes.

It is noted that although three dependency modes are described above for the refined dependency graph, the dependency modes are not limited to the above defined modes, and those skilled in the art would design other rules for different dependency modes.

As described above, since the developer knows exactly the interdependencies of multiple applications under development, in some embodiments, the developer may record the dependencies for respective image layers with different versions during the development process. By reading the pre-recorded dependencies for multiple applications, the dependency graph may be automatically generated.

Figure 5:
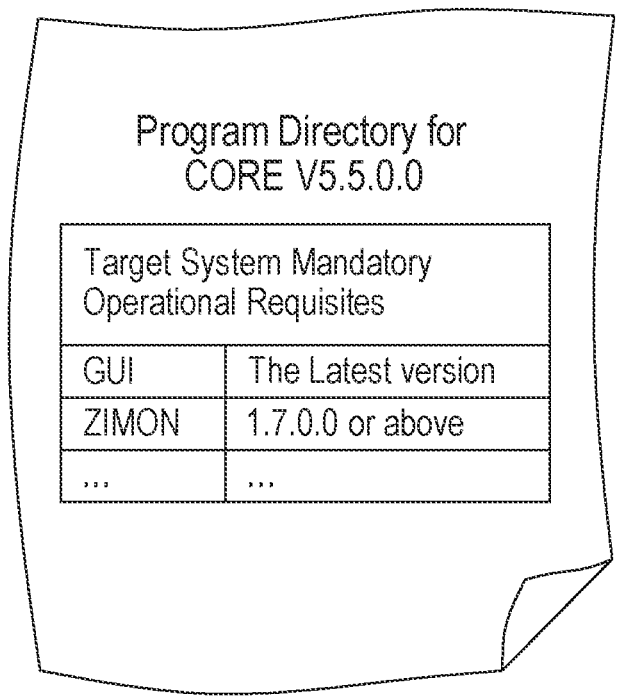
FIG. 5 shows an exemplary program directory for an application recording dependencies with other applications according to some embodiments of the present invention.

In some embodiments, the dependencies may be pre-recorded in program directories for respective applications. FIG. 5 shows an exemplary program directory for an application recording dependencies with other applications according to some embodiments of the present invention.

As can be seen from FIG. 5, for "CORE" of version 5.5.0.0, the target system mandatory operational requisites are that if "CORE" of version 5.5.0.0 is to run on the target system, the latest version of "GUI" should be installed on the target system, and the version of "ZIMON" should be 1.7.0.0 or above. For other applications, similar requisites may be defined. Further, the first line "GUI: The latest version" may be identified as corresponding to the latest dependency mode, and the second line "ZIMON: 1.7.0.0 or above" may be identified as corresponding to the minimum dependency mode. The refined dependency graph with different dependency mode may be separately generated based on the pre-recorded program directory.

Figure 6:
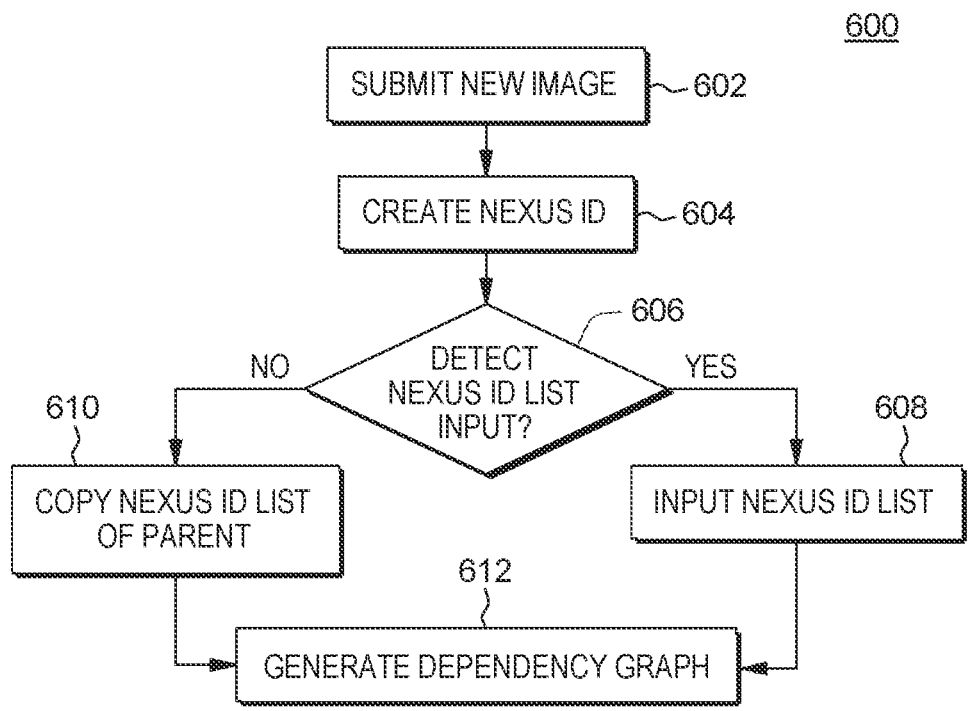
FIG. 6 shows a flow chart of an exemplary method for generating a dependency graph according to some embodiments of the present invention.

Now refer to FIG. 6, which shows a flow chart of an exemplary method 600 for generating a dependency graph according to some embodiments of the present invention. The method 600 may be introduced into a graph driver for generating the dependency graph.

A developer may run a container and start a development work on a new image layer. In block 602, the developer submits a new image layer onto its container repository.

In block 604, a unique identity (ID) may be created for the new image layer. In some embodiments, a nexus ID may be created for the new image layer, which is generated based on an ID of the image layer and a Uniform Resource Locator (URL) of the corresponding container repository. The ID of the image layer is a local ID within the container repository of the image layer, but cannot be used as a global ID to uniquely identify the image layer among a plurality of container repositories. Therefore, a nexus ID is created based on the ID of the image layer and the URL of the corresponding container repository, and thus the image layer may be uniquely identified.

In some embodiments, a Hash operation such as "SHA256" may be performed on the ID of the image layer and the URL of the container repository to create the nexus ID. For example, the nexus ID of version 5.5.0.0 of "CORE" may be created as $$\text{Nexus\_Id}_{core\_5.5} = SHA256(URL_{repository\ core}: \text{Image\_Id}_{core\_5.5}),$$

wherein SHA256 (A: B) denotes the SHA256 operation on A and B, $URL_{repository\_core}$ denotes the URL of the container repository "CORE", and $Image\_Id_{core\_5.5}$ denotes the image ID of version 5.5.0.0 of "CORE".

Further, in block 606, a detection of nexus ID list input is performed. The nexus ID list includes the nexus ID(s) and container repository URL(s) of image layer(s) that have a direct dependency on this image. The URL may be used for addressing the container repository, while the nexus ID may be used for identifying the specific image layer. For example, for version 5.5.0.0 of CORE, the nexus ID list may be expressed as:

$$\text{Nexus ID List: } \{Rurl: tp: 9.30.1.221/GUI, Nid: 902241 \ldots ,\},$$

wherein "Nid: 902241" denotes the nexus ID of an image layer of the container repository "GUI" having a dependency on the image layer of version 5.5.0.0 of "CORE", and "Rurl:tp:9.30.1.221/GUI denotes the URL of "GUI".

The nexus ID list may be automatically created by reading the program directory for the target image layer (such as the program directory shown in FIG. 5). Further, the nexus ID list may be aligned with any of the latest dependency mode, the minimum dependency mode and the customized dependency mode. In some embodiments, different nexus ID lists may be generated for different dependency modes. In addition, since in the latest dependency mode, the latest version may always be determined as the dependent image layer, the nexus ID list in the latest dependency mode may share the nexus ID list in the minimum dependency mode or the customized dependency mode.

If the nexus ID list input is detected in block 606, the method 600 proceeds to block 608 to input nexus ID list and generate the dependency graph in block 612. Further, if nexus ID list input is not detected in block 606, the method 600 proceeds to block 610 to copy the nexus ID list of the parent of the target image layer and generate the dependency graph in block 612.

In block 612, the dependency graph may be generated based on the input nexus ID list of the target image layer, in which the nodes of the dependency graph representing the image layer are determined by the nexus IDs, and the edge between two nodes representing the dependency of two image layers are determined by the nexus ID list.

It is noted that the above-described method 600 may be applicable to generate the refined dependency graph according to some embodiments of the present disclosure. Further, for the rough dependency graph, since it only recites dependencies of different container repositories, the nexus ID uniquely identify an image layer is not necessary, and only URLs of repository containers are needed for generating the dependency graph.

Figure 7:
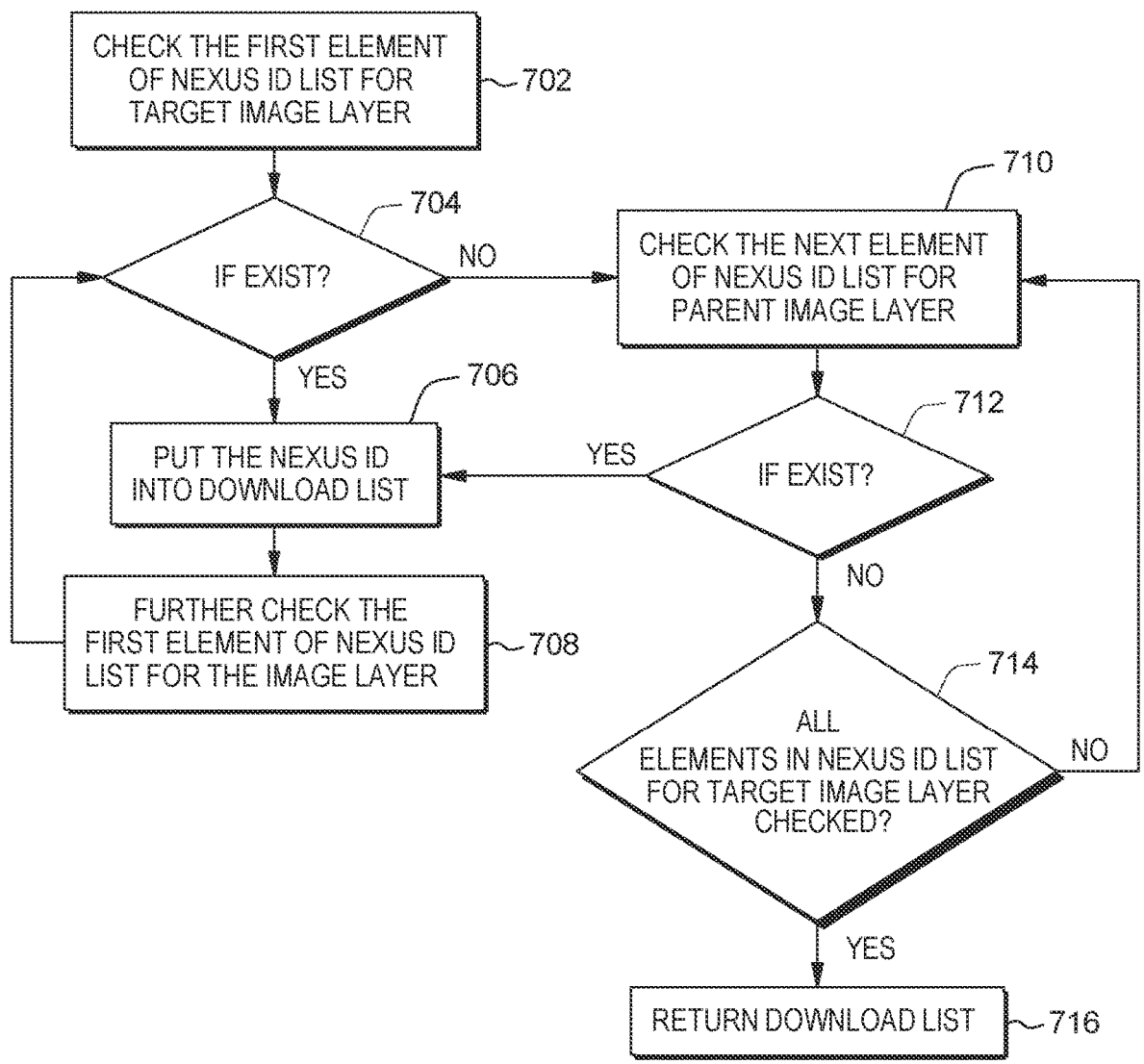
FIG. 7 shows a flow chart of another exemplary method for multi-application deployment according to some embodiments of the present invention.

Now refer to FIG. 7, which shows a flow chart of another exemplary method 700 for multi-application deployment according to some embodiments of the present invention.

The method 700 may be introduced into Ansible's automation engine. Ansible is a simple automation language which can automate manual deployment logic, simplify the deployment process, and improve deployment efficiency.

The method 700 may be invoked when the user runs a playbook with Ansible including a specific command indicating the deployment considering interdependencies of different application. For example, a command "dependency" may be used for invoking the method 700. In response to the command, the method 700 may be started by reading the dependency graph generated by method 600. It is noted that Ansible is an exemplary tool for running the method 700 of the present application, and the method 700 may be applied by using other tools according to actual needs.

Specifically, in block 702, the first element of nexus ID list for the target image layer (e.g., with a nexus ID "A") is checked to find a direct dependency on the target image layer. For example, in a case that the nexus ID "A" identifies the latest version 5.5.0.0 of the container repository "CORE", the nexus ID list may include the URL of GUI and the nexus ID of the latest version 4.4.0.0 of GUI (in latest dependency mode).

If it is checked in block 704 that the first elements exists, which means a dependent image layer (e.g., the latest version 4.4.0.0 of container repository "GUI") on the target image layer exists, in block 706, the nexus ID (e.g., with an nexus ID "B") is put into download list.

Next, in block 708, the nexus ID list of the image layer corresponding to the nexus ID just put into download list in block 706 (e.g., with nexus ID "B" of the latest version 4.4.0.0 of GUI) is further checked to find a direct dependency with the image layer with nexus ID "B", which indicate an indirect dependency with the target image layer with nexus ID "A".

The processes of blocks 704~708 may be recursively performed to find all direct/indirect dependencies on the first element, until no elements exists in block 704. For example, after checking the nexus ID list of the latest version 4.4.0.0 of GUI, the latest version 3.2.0.0 of the container repository ZIMON (e.g., with nexus ID "C") is found, which has a direct dependency on the latest version 4.4.0.0 of GUI, and has an indirect dependency on the latest version 5.5.0.0 of CORE. Accordingly, the nexus ID of the latest version 3.2.0.0 of the container repository ZIMON is also put into the download list.

Then, if it is checked in block 704 that no element exists in the nexus ID list, in block 710, the next element of nexus ID list for a parent image layer is further checked. The parent image layer means the parent image layer of the image layer being processed in the recursive processes of blocks 704~708. For example, if it is determined in block 704 that there exists no element in nexus ID list for the latest version 3.2.0.0 of the container repository ZIMON with nexus ID "C", the next element of nexus ID list for the image layer with nexus ID "B" (which is the parent image layer of the image layer with nexus ID "C") is checked in block 710. If it is checked in block 712 that the next element of nexus ID list for the parent image layer (e.g., with the nexus ID "B") exists (e.g., the next element with a nexus ID "D"), the nexus ID (e.g., with the nexus ID "D") is put into the download list in block 706. The processes blocks 710, 712 and 704-708 are further recursively performed to find all direct/indirect dependencies on the next element, until all elements are checked and blocks 714 is "No".

Then method 700 proceeds to block 716 to return the download list for downloading all image layers indicated by the download list.

According to the method 700, all dependent image layers may be automatically found and downloaded so that interdependent applications may be deployed and updated automatically and efficiently.

In some embodiments, the image layers indicated by the download list may not be directly downloaded but be compared with the image layers hosted on the user's device. In some embodiments, only the image layers indicated by the download list which are different from the image layers hosted on the user's device are downloaded. Accordingly, image layers may be downloaded on demand, and unnecessary downloads of image layers may be reduced, which not only improves the efficiency of deployment, but also reduces the error rate of deployment.

It should be noted that the processing of multi-application deployment according to embodiments of this disclosure could be implemented in the computing environment of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

According to an embodiment of the present disclosure, there is provided a system for multi-application deployment. The system may comprise one or more processing units and a memory coupled to at least one of the one or more processing units. The system may further comprise a set of computer program instructions stored in the memory and executed by at least one of the one or more processing units in order to perform actions including receiving a command from a user for performing an action on a first image layer of a first container repository; determining a second container repository which has a dependency on the first container repository, based on a dependency graph storing dependencies of a plurality of container repositories; and performing the action on the first image layer of the first container repository and a corresponding action on a second image layer of the second container repository based on the command.

According to an embodiment of the present disclosure, there is provided a computer program product. The computer program product may comprise a computer readable storage medium having program instructions embodied therewith. The program instructions may be executable by a device to cause the device to perform a method. The method may comprise receiving a command from a user for performing an action on a first image layer of a first container repository; determining a second container repository which has a dependency on the first container repository, based on a dependency graph storing dependencies of a plurality of container repositories; and performing the action on the first image layer of the first container repository and a corresponding action on a second image layer of the second container repository based on the command.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for multi-application deployment on a computer, comprising:
   receiving, by one or more processors, a command for performing an action on a first image layer of a first container repository;
   in response to the command for performing the action, determining, by the one or more processors, a second container repository which has a dependency on the first container repository, based, at least in part, on a dependency graph storing dependencies of a plurality of container repositories, wherein the dependency is specified in the dependency graph which records compatibility between the plurality of container repositories for multiple applications; and
   in response to the command for performing the action, performing, by the one or more processors, the action on the first image layer of the first container repository and a corresponding action on a second image layer of the second container repository based on the dependency graph, to maintain the compatibility between the plurality of container repositories for the multiple applications.

2. The computer-implemented method of claim 1, wherein the method further comprises:
   determining, by the one or more processors, a latest version image layer of the second container repository as the second image layer.

3. The computer-implemented method of claim 1, wherein the dependency graph further stores dependencies of a plurality of image layers of the plurality of container repositories, and the method further comprises:
   determining, by the one or more processors, an image layer of the second container repository which has a dependency on the first image layer of the first container repository, based on the dependency graph, as the second image layer.

4. The computer-implemented method of claim 3, wherein an available oldest version image layer of the second container repository is determined as having the dependency on the first image layer.

5. The computer-implemented method of claim 3, wherein an image layer of the second container repository specified by a user is determined as having the dependency on the first image layer.

6. The computer-implemented method of claim 3, wherein the first image layer of the first container repository is identified in the dependency graph by a nexus identity (ID) which is generated based on an ID of the first image layer and a Uniform Resource Locator (URL) of the first container repository.

7. The computer-implemented method of claim 6, wherein one or more image layers having dependencies on the first image layer are identified in the dependency graph by a nexus ID list including the nexus IDs of the one or more image layers and the URLs of the corresponding container repositories of the one or more image layers.

8. The computer-implemented method of claim 1, further comprises:
   determining, by the one or more processors, a third container repository which has a dependency on the second repository, based on the dependency graph; and
   performing, by the one or more processors, a corresponding action on a third image layer of the third container repository based on the command.

9. The computer-implemented method of claim 8, wherein the action on the first image layer includes downloading the first image layer, and the method further comprises:
   comparing, by the one or more processors, the first image layer, the second image layer and the third image layer with the image layers hosted on a user's device; and downloading, by the one or more processors, one or more image layers among the first image layer, the second image layer and the third image layer which are different from the image layers hosted on the user's device.

10. A system for multi-application deployment on a computer, comprising:
one or more processors;
a memory coupled to at least one of the one or more processors;
a set of computer program instructions stored in the memory and executed by at least one of the one or more processors in order to perform actions of:
receiving a command for performing an action on a first image layer of a first container repository;
determining, in response to the command for performing the action, a second container repository which has a dependency on the first container repository, based on a dependency graph storing dependencies of a plurality of container repositories, wherein the dependency is specified in the dependency graph which records compatibility between the plurality of container repositories for multiple applications; and
performing, in response to the command for performing the action, the action on the first image layer of the first container repository and a corresponding action on a second image layer of the second container repository based on the dependency graph, to maintain the compatibility between the plurality of container repositories for the multiple applications.

11. The system of claim 10, wherein the actions further comprise:
determining a latest version image layer of the second container repository as the second image layer.

12. The system of claim 10, wherein the dependency graph further stores dependencies of a plurality of image layers of the plurality of container repositories, and the actions further comprise:
determining an image layer of the second container repository which has a dependency on the first image layer of the first container repository, based on the dependency graph, as the second image layer.

13. The system of claim 12, wherein an available oldest version image layer of the second container repository is determined as having the dependency on the first image layer.

14. The system of claim 12, wherein an image layer of the second container repository specified by a user is determined as having the dependency on the first image layer.

15. The system of claim 12, wherein the first image layer of the first container repository is identified in the dependency graph by a *nexus* identity (ID) which is generated based on an ID of the first image layer and a Uniform Resource Locator (URL) of the first container repository.

16. A computer program product for multi-application deployment on a computer, the computer program product comprising a computer readable storage medium having program instructions embodied therewith, wherein the program instructions being executable by a device to cause the device to perform a method comprising:
receiving a command for performing an action on a first image layer of a first container repository;
determining, in response to the command for performing the action, a second container repository which has a dependency on the first container repository, based on a dependency graph storing dependencies of a plurality of container repositories, wherein the dependency is specified in the dependency graph which records compatibility between the plurality of container repositories for multiple applications; and
performing, in response to the command for performing the action, the action on the first image layer of the first container repository and a corresponding action on a second image layer of the second container repository based on the dependency graph, to maintain the compatibility between the plurality of container repositories for the multiple applications.

17. The computer program product of claim 16, wherein the method further comprises:
determining a latest version image layer of the second container repository as the second image layer.

18. The computer program product of claim 16, wherein the dependency graph further stores dependencies of a plurality of image layers of the plurality of container repositories, and the method further comprises:
determining an image layer of the second container repository which has a dependency on the first image layer of the first container repository, based on the dependency graph, as the second image layer.

19. The computer program product of claim 18, wherein an available oldest version image layer of the second container repository is determined as having the dependency on the first image layer.

20. The computer program product of claim 18, wherein an image layer of the second container repository specified by a user is determined as having the dependency on the first image layer.

* * * * *